US008472485B2

(12) United States Patent
Spadaro et al.

(10) Patent No.: US 8,472,485 B2
(45) Date of Patent: Jun. 25, 2013

(54) METHODS AND APPARATUSES TO SUPPORT MULTIPLE FIBER NETWORKING PLATFORMS

(75) Inventors: Derek Spadaro, Santa Barbara, CA (US); Dov Zimring, Goleta, CA (US)

(73) Assignee: Calix, Inc., Petaluma, CA (US)

(*) Notice: Subject to any disclaimer, the term of this patent is extended or adjusted under 35 U.S.C. 154(b) by 718 days.

(21) Appl. No.: 12/648,817

(22) Filed: Dec. 29, 2009

(65) Prior Publication Data

US 2011/0158639 A1    Jun. 30, 2011

(51) Int. Cl.
*H04J 3/12* (2006.01)
*H04J 3/22* (2006.01)

(52) U.S. Cl.
USPC .......................................... 370/522; 370/465

(58) Field of Classification Search
None
See application file for complete search history.

(56) References Cited

U.S. PATENT DOCUMENTS

| | | | | |
|---|---|---|---|---|
| 2003/0223746 A1* | 12/2003 | Belhadj-Yahya et al. | ...... | 398/27 |
| 2007/0171943 A1* | 7/2007 | Huang et al. | .................. | 370/522 |
| 2009/0146852 A1* | 6/2009 | Diab | ............................ | 341/100 |

OTHER PUBLICATIONS

Calix Fiber Access, downloaded from https://portal.calix.com/products/p-series/calix_residential_ONTs.html on Nov. 11, 2009.
Calix Residential ONTs, downloaded from https://portal.calix.com/solutions/fiber_access.html on Nov. 11, 2009.
International Telecommunication Union (ITU-T), "Series G: Transmission Systems and Media, Digital Systems and Networks—Digital Sections and Digital Line System—Optical Line Systems for Local Access Networks," G.986, Jan. 2010, 18 pages.
PCT Notification of Transmittal of The International Search Report and the Written Opinion of the International Searching Authority or The Declaration for PCT Counterpart Application No. PCT/US2010/062269 Containing International Search Report, 10 pgs. (Apr. 13, 2011).
International Telecommunication Union (ITU). ITU-T, G.984.4. Series G: Transmission Systems and Media, Digital Systems and Networks: Digital Sections and digital line systems—Optical line systems for local and access networks. Gigabit-capable Passive Optical Networks (G-PON): Transmission convergence layer specification (Mar. 2008).
IEEE 802.3™-2002—IEEE Standard for Information technology—Specific requirements—Part 3: Carrier Sense Multiple Access with Collision Detection (CSMA/CD) Access Method and Physical Layer Specifications, pgs. cover page, table of contents (xiv-xxii), Section One (pp. 1-31), Section Two (pp. 56-131, 132-167, 353-444), Section Three (pp. 32-77 and 147-249) (Mar. 6, 2002).

* cited by examiner

*Primary Examiner* — Clemence Han
(74) *Attorney, Agent, or Firm* — Blakely, Sokoloff, Taylor & Zafman LLP (57) ABSTRACT

Methods and apparatuses to support multiple access platforms on a network device are described. One or more first signals are sensed. First synchronization data associated with the one or more first signals are determined. A first networking protocol can be determined based on the first synchronization data. The first networking protocol can be determined before transmission is enabled at the network device. A first mode associated with the first networking protocol can be enabled. The one or more first signals are sensed at a first rate. One or more second signals are sensed at a second rate. A second networking protocol can be determined based on the one or more second signals. A second mode associated with the second networking protocol can be enabled.

40 Claims, 10 Drawing Sheets

METHODS AND APPARATUSES TO SUPPORT MULTIPLE FIBER NETWORKING PLATFORMS

FIELD

Certain embodiments of the present invention relate to communication networks, and, more particularly, to supporting multiple networking platforms.

BACKGROUND

An access network is a part of a communications network which connects subscribers to a service provider. Fiber to the x ("FTTx") typically refers to a fiber-to-the premises broadband network architecture that uses an optical fiber to replace all or part of the metal local loop used for last mile telecommunications. In FTTx networks, information is typically transmitted in downstream direction at 1490 nm wavelength and in upstream direction at 1310 nm wavelength.

Gigabit Passive Optical Network ("GPON") and Active Ethernet technologies are two popular alternatives to provide triple-play services (e.g., voice, video, and data) to users in FTTx networks. GPON and Active Ethernet are both technologies which allow transmission over optical fiber. The GPON and Active Ethernet technologies, however, are significantly different from each other.

Figure 1A:
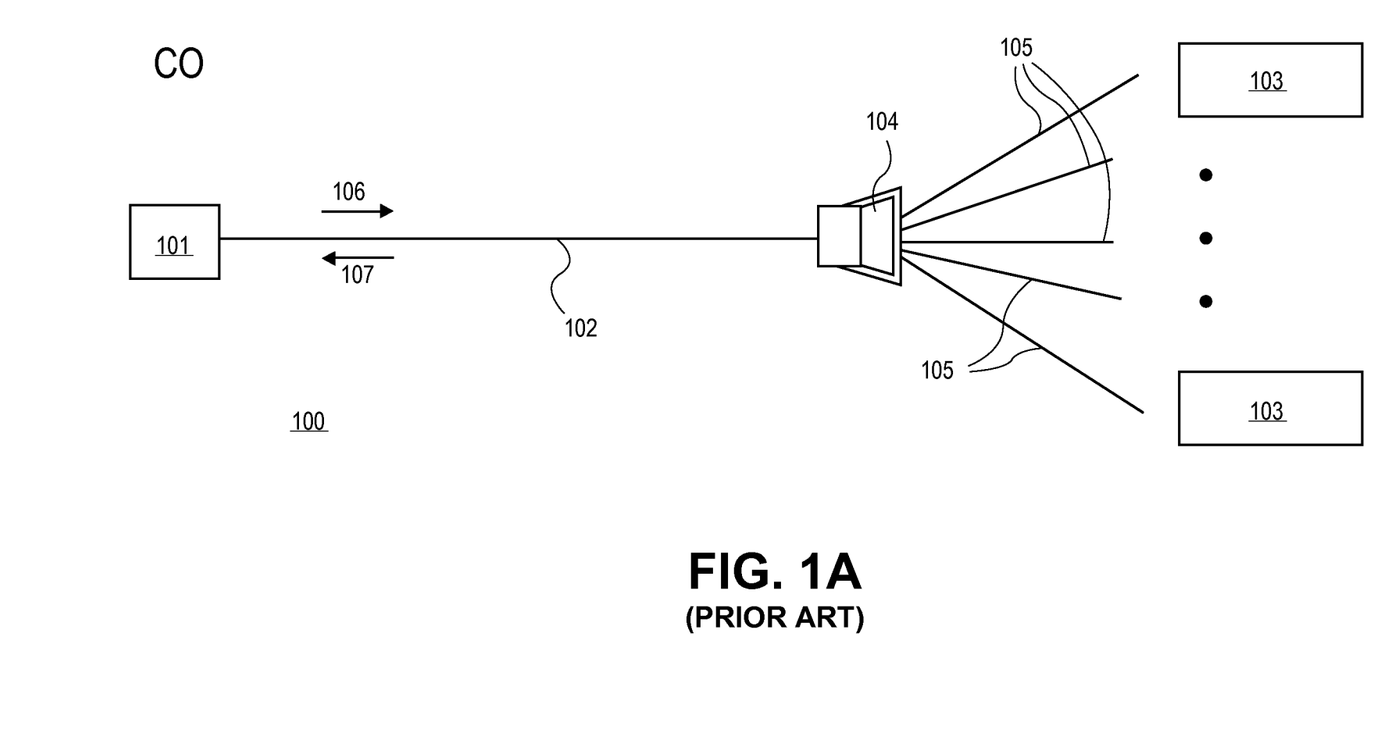
FIG. 1A shows a prior art passive optical network ("PON") for use in FTTx.

FIG. 1A shows a typical passive optical network ("PON") for use in FTTx. As shown in FIG. 1A, PON 100 is a point-to-multipoint architecture, which includes an optical line terminal ("OLT") 101 that may be located at a Central Office ("CO") connected to a set of optical network terminals ("ONTs") 103 that may be located at the customer premises through a feeder fiber 102, an optical power splitter 104, and individual distribution fibers 105. Information is typically transmitted downstream 106 from OLT 101 to each of ONTs 103, upstream 107 from each of the ONTs 103 to OLT 101 on feeder fiber 102 by using a time division multiplexing scheme, in which dedicated transmission time slots are granted to each individual optical network terminal of ONTs 103 to avoid data collisions.

Figure 1B:
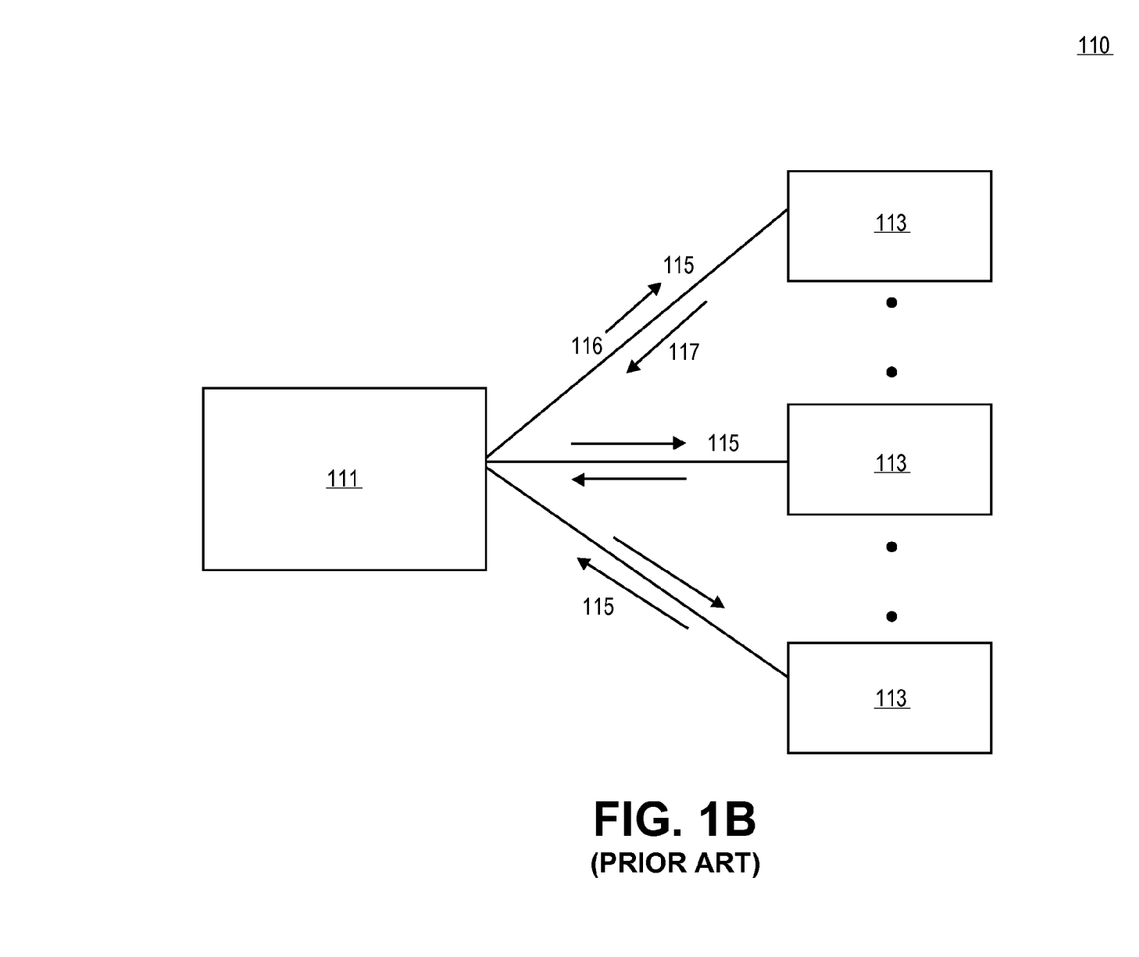
FIG. 1B shows a prior art Active Ethernet architecture 110 for use in FTTx.

FIG. 1B shows a typical Active Ethernet architecture 110 for use in FTTx. As shown in FIG. 1B, Active Ethernet architecture 110 is a point-to-point architecture, which includes an optical line terminal ("OLT") 111 and a set of optical network terminals ("ONTs") 113 located at the customer premises. Each of the ONTs 113 is connected to the OLT 111 directly through its own distribution fiber 115. Data may be transmitted downstream 116 from OLT 111 to each of the ONTs 113, and upstream 117 from each of the ONTs 113 to OLT 111. As shown in FIG. 1B, the fiber is not shared among multiple ONTs 113.

In conventional systems, a physical layer (e.g., transceivers, fibers, and/or any other optics) typically cannot be shared by the different network protocols—e.g., by GPON and Active Ethernet protocols. For example, transmitting data in upstream direction in a steady state PON can typically disrupt all other network interface devices due to the time division multiplexing ("TDM") nature of upstream transmission in the point-to-multipoint case. It typically is difficult to reliably determine without manual intervention which networking protocol is currently used in an access network. Sharing the physical layer among different protocols without reliably knowing which protocol is appropriate for use may corrupt transmission of information.

SUMMARY

Exemplary embodiments of methods and apparatuses to support multiple access platforms on a network device are described. One or more first signals are sensed. The one or more first signals can be sensed at a first rate. Synchronization data associated with the one or more first signals are determined. A first networking protocol can be determined based on the synchronization data. For at least some embodiments, the first networking protocol is determined before transmission is enabled at the network device. The first networking protocol may be associated with a first access platform. Transmission in a first mode associated with the first networking protocol can be enabled when the first networking protocol is determined. One or more second signals can be sensed at a second rate. A second networking protocol can be determined based on the one or more second signals. The second networking protocol may be associated with a second access platform. Transmission in a second mode associated with the second networking protocol can be enabled when the second networking protocol is determined.

For at least some embodiments, a network device includes a transceiver; a clock/data recovery unit coupled to the transceiver to sense one or more first signals; and a processing unit coupled to the transceiver, the processing unit configured to determine synchronization data associated with the one or more first signals, determine a first networking protocol based on the synchronization data; and a memory coupled to the processing unit. For at least some embodiments, the transmission from the transceiver is disabled until the first networking protocol is determined. For at least some embodiments, the clock/data recovery unit coupled to the transceiver is configured to sense the one or more first signals at a first rate. The processing unit of the network device can be configured to set the clock/data recovery unit to sense the one or more second signals at a second rate to determine the second networking protocol. For at least some embodiments, the processing unit of the network device is configured to enable a first mode associated with the first networking protocol, and to enable a second mode associated with the second networking protocol.

For at least some embodiments, the processing unit of the network device includes a reprogrammable logic coupled to the clock/data recovery unit. The reprogrammable logic can be coupled to a first networking protocol interface; and to a second networking protocol interface.

For at least some embodiments, the clock/data recovery unit of the network device includes a first port to a first networking interface and a second port to a second networking interface. For at least some embodiments, the network device includes a switch.

Other features and advantages of embodiments of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements.

DETAILED DESCRIPTION

Exemplary embodiments of methods and apparatuses to support multiple access platforms on a network device are described. Multiple access platforms as well as changes in the access platforms can be detected in the network device automatically, without operator intervention. One or more first signals are sensed. The one or more first signals can be sensed at a first rate. Synchronization data associated with the one or more first signals are determined. A first networking protocol can be automatically determined based on the synchronization data, as described in further detail below. For at least some embodiments, the first networking protocol is determined before transmission is enabled at the network device. The first networking protocol may be associated with a first access platform. Transmission in a first mode associated with the first networking protocol can be enabled when the first networking protocol is determined. One or more second signals can be sensed at a second rate. A second networking protocol can be determined based on the one or more second signals. The second networking protocol may be associated with a second access platform. Transmission in a second mode associated with the second networking protocol can be enabled when the second networking protocol is determined, as described in further detail below.

Methods and apparatuses described herein can address fiber-to-the premises ("FTTx") applications that include a point-to-multipoint network—e.g., a passive optical network ("PON")—that are intended to migrate to a point-to-point network—e.g., an Active Ethernet network. A PON network may be an ATM PON, Broadband PON ("BPON"), Gigabit PON ("GPON"), or other PON network. Methods and apparatuses to provide a single network device capable of supporting multiple fiber access platforms described herein can be beneficial for the network equipment manufacturers.

For at least some embodiments, methods and apparatuses to reliably auto-detect and auto-configure line protocols is described herein. These methods and apparatuses utilize commonalities among standardized access network technologies and include software and/or firmware algorithms to provide a versatile device capable of supporting multiple networking platforms (e.g., GPON and Active Ethernet). Such a design can be useful for network upgrade paths without the need to swap, or even touch, customer premise hardware, as well as for simplifying equipment provider logistics.

GPON and Ethernet are platforms that both may be transmitted over an optical fiber. These technologies, however, may quickly diverge beyond this commonality. Typically, the downstream effective physical data rates for PON and Ethernet platforms are about a factor of 2 apart. For example, the downstream data rate is about 1.25 Gigabit per second ("Gbps") for 1000X Ethernet, and about 2.48832 for GPON. Typically, transmitter/receiver ("Tx/Rx") wavelengths are set to 1490 nm and 1310 nm, respectively to match the physical medium for both PON and Ethernet technologies. As such, the fiber plant and physical medium dependent ("PMD") layers may be identical for both PON and Ethernet technologies that allows sharing a single set of optics to participate in both PON and Ethernet networks.

For at least some embodiments, a network device to support multiple access platforms described herein determines automatically, without manual intervention which network protocol out of a plurality of network protocols is appropriate by listening only, as described in further detail below. For at least some embodiments, the network device to support multiple access platforms automatically changes its configuration based on what network protocol is detected when it gets plugged in.

Transmitting upstream in a steady state point-to-multipoint network (e.g., PON) may disrupt all other network interface devices, due to the time division multiplexing ("TDM") nature of upstream transmission. Therefore, embodiments of a network device described herein determine which networking protocol is currently in use before enabling any transmission (e.g., by turning on a laser). For at least some embodiments, changes to the Ethernet physical coding sub-layer ("PCS") to support multiple access platforms are proposed to enhance the reliability and reduce the probability of error.

Figure 2:
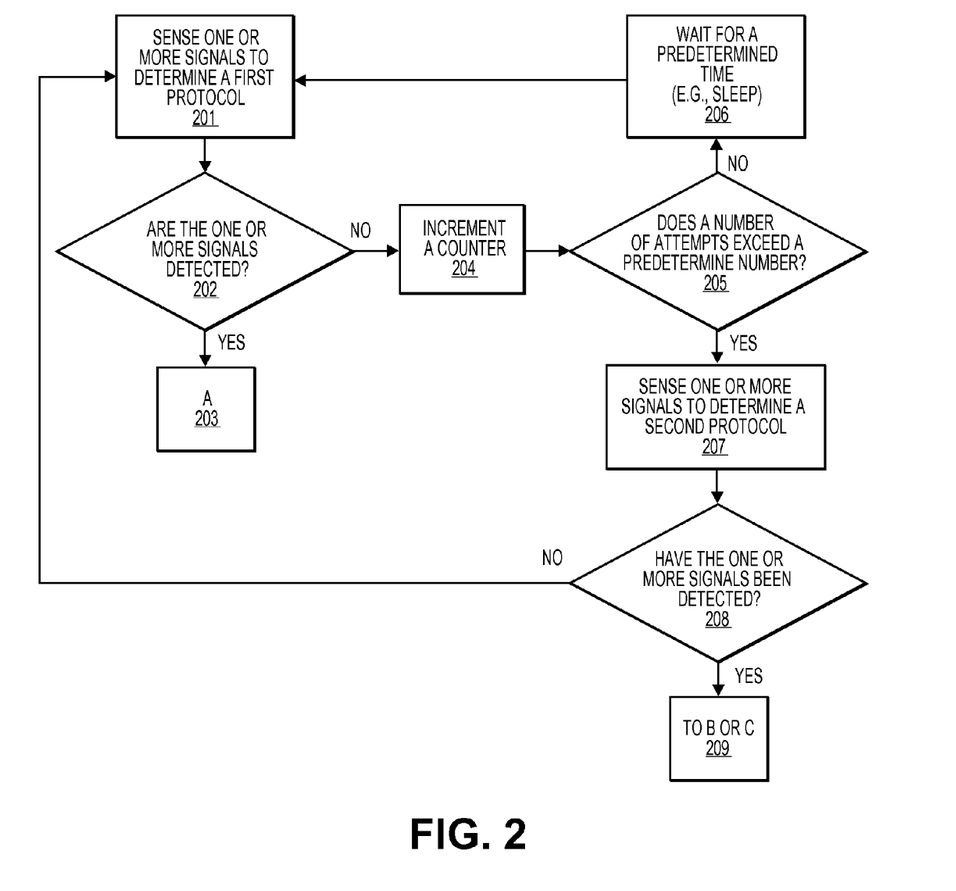
FIG. 2 shows a flowchart of one embodiment of a method to support a plurality of networking platforms.

FIG. 2 shows a flowchart of one embodiment of a method to support a plurality of networking platforms. Method 200 begins with operation 201 involving sensing one or more signals to determine a first networking protocol. Sensing the one or more first signals begins in response to powering up the network device. For at least some embodiments, a clock/data recovery function is set to sense one or more signals at a data transmission rate that corresponds to a point-to-multipoint protocol used for an access network platform in response to powering up the network device. For one embodiment, the first data transmission rate is about 125 Megabits per second ("Mbps"), 155 Mbps, 622 Mbps, 1.25 Gbps, 2.5 Gbps, 10 Gbps, 40 Gbps, or any other data transmission rate for a PON-based access network. For one embodiment, the one or more first signals are sensed at a downstream link at about 2.488 Gbps according to a networking protocol for a GPON access platform. The network device can be powered up initially (an initial power up), or after a link was down. The link may be down, for example, due to loss of carrier sense/signal detect or due to synchronization failure for more than 10 milliseconds ("SYNC-FAIL assert").

Method 200 continues with operation 202 that involves determining whether the one or more signals are detected. If the one or more signals are detected (e.g., "carrier sense" is asserted), method 200 continues with searching for synchronization data in the one or more signals at operation 203 ("A"). Detecting synchronization data in the one or more signals to determine the networking protocol is described in further detail with respect to FIG. 3. If the one or more signals are not detected (e.g., a "carrier sense" is not asserted), a counter optionally can be incremented at operation 204. At operation 205 it can be determined whether a number of unsuccessful attempts to sense the one or more signals exceeds a predetermined number.

If the number of unsuccessful attempts to detect one or more signals at a first rate does not exceed the predetermined number, method 200 returns to operation 201 after waiting for a predetermined time (e.g., going to sleep) at operation 206. The waiting time may be about 5-10 seconds, or any other time. If the number of unsuccessful attempts exceeds the predetermined number (e.g., three consecutive failures, or any other number of failures), or the one or more signal have not been detected at the first rate for a predetermined time (e.g., 5-15 seconds), at operation 207 switching to sensing one or more signals at a second rate to determine a second networking protocol is performed. For one embodiment, a clock/data recovery ("CDR") function is switched to sense one or more signals at a second rate if the one or more signals at the first rate are not detected. As a result, for one embodiment, detection period of about 5-15 seconds may be required to identify a second networking protocol. For one embodiment, the second networking protocol comprises a point-to-point protocol, e.g., an Ethernet protocol. For one embodiment, the second rate is about 125 Megabits per second ("Mbps"), 155 Mbps, 622 Mbps, 1.25 Gbps, 2.5 Gbps, 10 Gbps, 40 Gbps, or any other data transmission rate for Ethernet access network. For one embodiment, operation 207 involves switching to sense one or more signals at 1.25 Gbps to determine the Ethernet protocol. For at least one embodiment, the first rate to sense the signals is different from the second rate to sense the signals. For one embodiment, the one or more signals are sensed at a downstream link at about 1.25 Gbps according to a networking protocol for an Active Ethernet access platform. For one embodiment, if one or more signals are detected at 1.25 Gbps, the 1000X Ethernet protocol bring up commences.

At operation 208 it is determined whether the one or more signals at the second rate are detected. If the one or more signals at the second rate are not detected, method 200 returns to operation 201. Optionally, method 200 may wait for a predetermined amount of time before returning to operation 201. If the one or more signals at the second rate are detected, method continues with operation 209 ("B or C") to determine synchronization data according to the second networking protocol, as described with respect to FIGS. 4 and 5 respectively. For at least some embodiments, transmission is disabled at least from operation 201 to operation 209.

Figure 3:
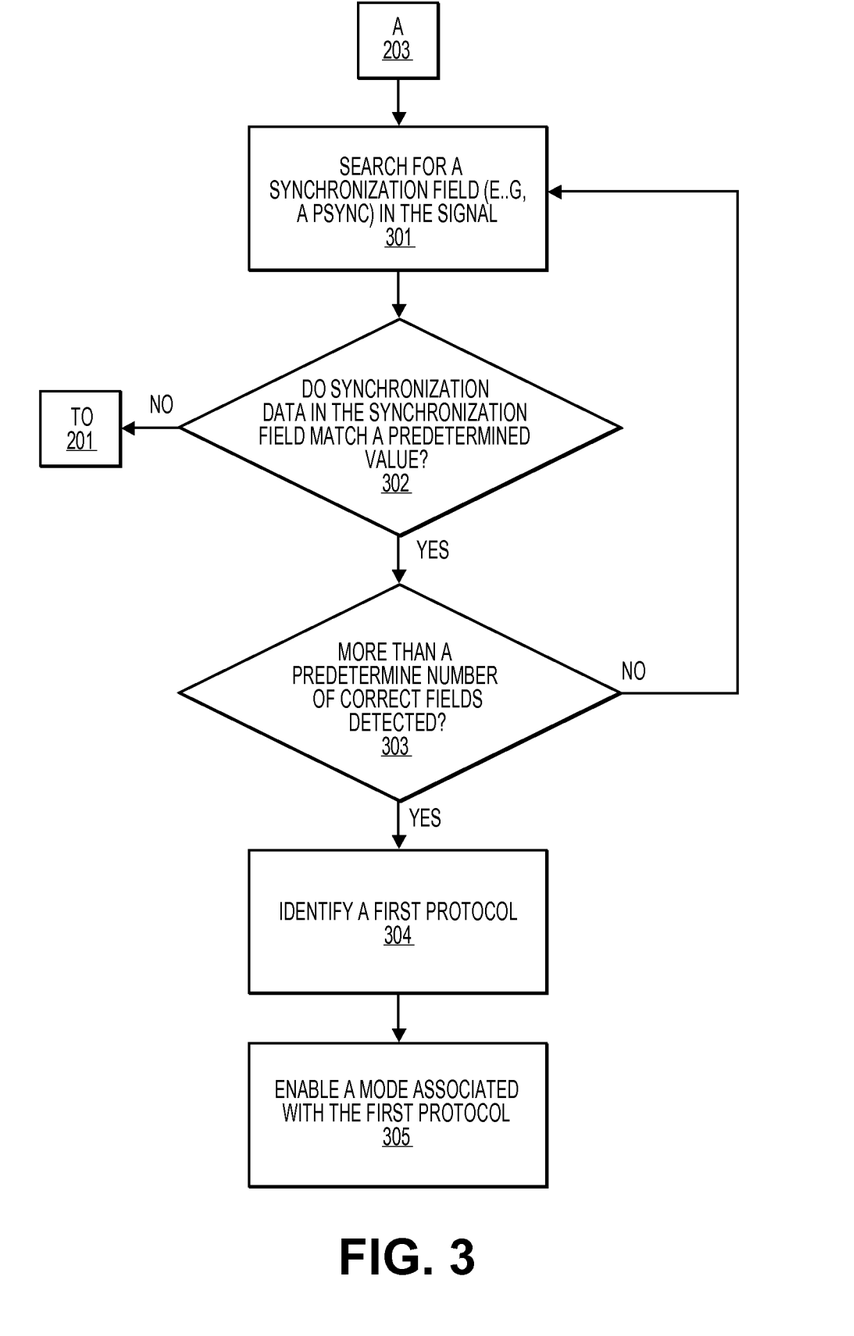
FIG. 3 shows a flowchart of one embodiment of a method to determine a networking protocol.

FIG. 3 shows a flowchart of one embodiment of a method to determine a networking protocol. Method 300 involves determining synchronization data in one or more signals detected at a first data transmission rate, as set forth above. At operation 301 searching for a physical synchronization field in the one or more detected signals is performed. For at least one embodiment, the physical synchronization field is a field in a detected signal that is never scrambled and always contains a well known value. For example, the physical synchronization field can be a first field found in a downstream physical control block of the GPON transmission convergence layer frame that contains 0xB6AB31E0 value. For at least one embodiment, when carrier sense is asserted at 2.488 Gbps a standardized psync hunt phase can begin.

At operation 302 it is determined whether synchronization data in a synchronization field of the frame of the detected signal match a predetermined value (e.g., 0xB6AB31E0). For example, synchronization data in the detected signal can be compared with a predetermined data stored in a memory. For one embodiment, determining whether the synchronization data in the synchronization field of the frame of the detected signal match a predetermined value is performed according to Telecommunication Standardization Sector (ITU-T) of the International Telecommunication Union ("ITU") Recommendation G.984.3. For example, the pattern in the synchronization field of the detected signal can be searched for in all possible alignments, both bit and byte. If the synchronization data in the field does not match the predetermined number, method 300 returns back to operation 201. If the synchronization data in the field match with a predetermined value, a determination is made at operation 303 whether a number of fields having the synchronization data that match the predetermined value (a number of "correct fields") is detected. If the number of correct fields is not detected, method 300 returns back to operation 301. If the number of correct fields in the one or more signals at a first data transmission rate is detected, the first networking protocol is identified at operation 304. For example, detecting five consecutive correct physical synchronization fields in the one or more downstream signals at 2.48832 Gbps may be required to consider a GPON link synchronized. For one embodiment, after the fifth (or any other predetermined number) psync field is positively identified the downstream link is considered synchronized at the GPON Transmission Convergence ("GTC") layer and standard Telecommunication Standardization Sector ("ITUT") G.984.3 Media Access Control ("MAC") functions begin. If the first networking protocol is identified, at operation 305 a first mode associated with the first networking protocol is enabled. For one embodiment, enabling the first mode includes transmitting the signals according to the first networking protocol, e.g., a GPON protocol. For at least one embodiment, the first networking protocol is determined before transmission is enabled. That is, for at least some embodiments, the transmission function of a network device is disabled throughout operations 201 to 304. For one embodiment, the first mode is enabled by enabling a first port of a multirate clock/data recovery ("CDR")/Serializer/Deserialiser ("SerDes") unit coupled to a first networking interface while disabling a second port of the multirate CDR/SerDes unit coupled to a second networking interface, as described in further detail below. For another embodiment, the first mode is enabled by enabling a first networking interface device, as described in further detail below.

Figure 4:
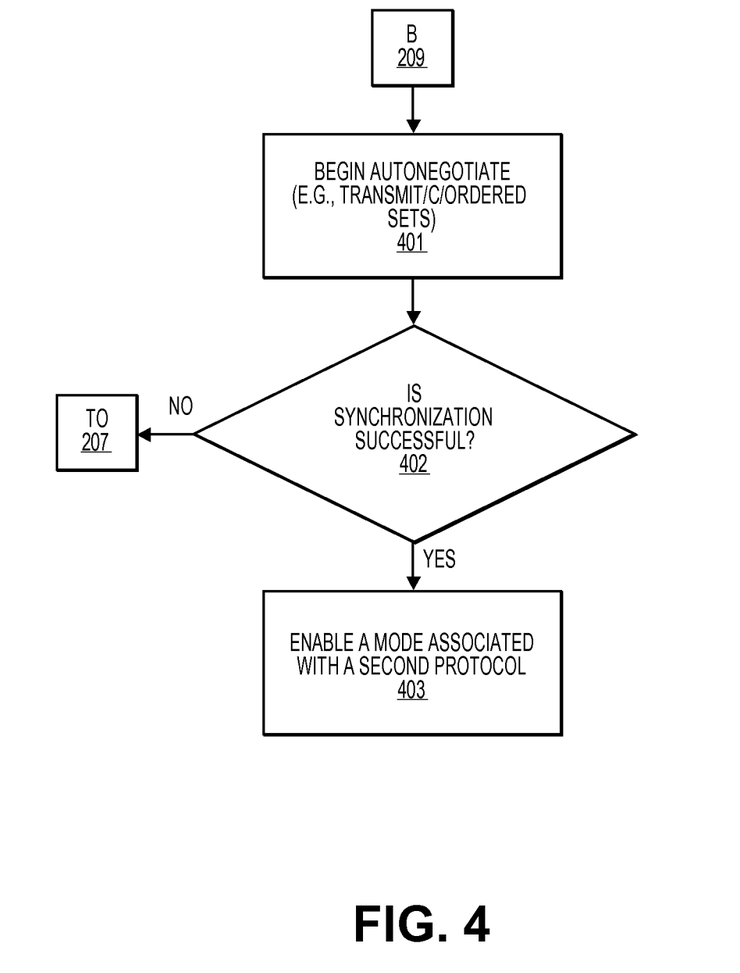
FIG. 4 shows a flowchart of another embodiment of a method to determine a networking protocol.

FIG. 4 shows a flowchart of another embodiment of a method to determine a networking protocol. Method 400 involves determining synchronization data associated with one or more signals detected at a second data transmission rate, as set forth above.

Determining synchronization data associated with the one or more signals can involve starting, at operation 401, an autonegotiation process. For one embodiment, an auto-negotiation process begins with transmission of synchronization data associated with a networking protocol to a remote end of a transmission link (e.g., a remote networking device). For at least one embodiment, the transmit function of a network device is disabled throughout operations 201 to 209. For one embodiment, the auto-negotiation process can start to acquire PCS layer synchronization. For one embodiment, when the one or more signals at 1.25 Gbps are detected, the auto-negotiation process involves transmitting /C/ordered sets associated with the signals according to IEEE 802.3 Ethernet protocol to acquire a PCS layer synchronization. The /C/ordered sets associated with the signals according to IEEE 802.3 Ethernet protocol are known to one of ordinary skill in the art of telecommunication.

At operation 402 it is determined whether the synchronization data have been identified positively as being associated with the second networking protocol and the synchronization process (e.g. at the PCS layer) is successful. At operation 403, if the synchronization data have been identified positively and the synchronization process is successful, a second mode associated with a second networking protocol is enabled. For one embodiment, enabling the second mode includes transmitting the signals according to the second networking protocol, e.g., Active Ethernet protocol. For one embodiment, the second mode is enabled by enabling a second port of a multirate clock/data recovery ("CDR")/Serializer/Deserialiser ("SerDes") unit coupled to a second networking interface while disabling a first port of the multirate CDR/SerDes unit coupled to a first networking interface, as described in further detail below. For another embodiment, the second mode is enabled by directly connecting to a first networking interface, as described in further detail below. If the synchronization data have not been identified positively, method returns back to operation 207. If the synchronization is not successful and the synchronization data have not been identified positively, method returns back to operation 207.

Figure 5:
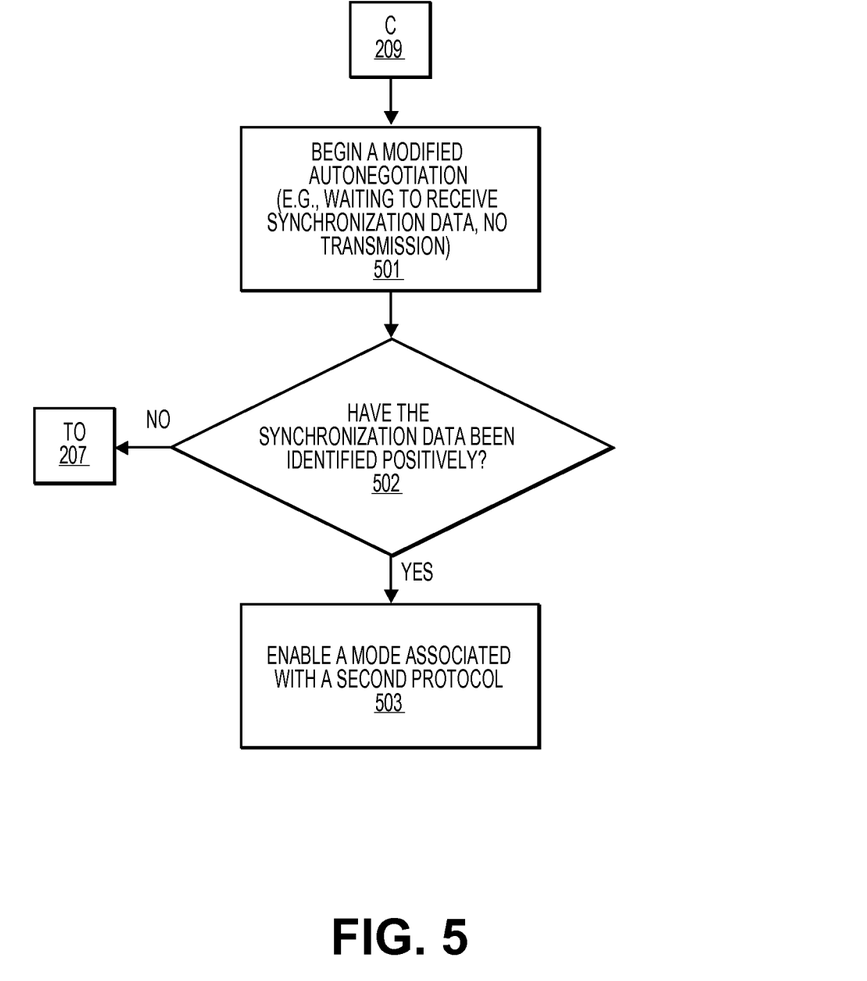
FIG. 5 shows a flowchart of another embodiment of a method to determine a networking protocol.

FIG. 5 shows a flowchart of another embodiment of a method to determine a networking protocol. Method 500 involves determining synchronization data associated with one or more signals detected at a second data transmission rate, as set forth above. Method 500 involves a modified autonegotiation process ("C"). Generally, the basic premise of the "smart" collocated Ethernet and GPON MACs is to not speak (e.g., transmit signals) until absolutely positive what language (e.g., network protocol) is required. For example, the 1000X PCS MAC sub-layer can be modified to assume that a far end of the link hop is going to start to auto-negotiate by sending synchronization data (e.g., /C/ordered sets). The modified auto-negotiation process is used further reduce the probability of inadvertently interrupting a functioning PON network and serves as an additional safeguard and assurance to correctly identify the networking protocol before enabling the transmission.

For one embodiment, method 500 starts with operation 501 that involves waiting for a predetermined time to receive a predetermined number of synchronization data associated with a second networking protocol from a remote network device at another end of a transmission link while keeping the transmission is disabled. For one embodiment, when the one or more signals at 1.25 Gbps are detected, the modified auto-negotiation process involves waiting to receive and identify a predetermined number of /C/ordered sets (e.g., 5) associated with the signals according to IEEE 802.3 Ethernet protocol while keeping the transmission function disabled.

At operation 502 it is determined whether the synchronization data have been positively identified as being associated with a networking protocol. If the synchronization data have been positively identified and the PCS layer synchronization is acquired, method continues with operation 503 that involves enabling a mode associated with the second networking protocol. For one embodiment, enabling the second mode includes transmitting the signals according to the second networking protocol. For at least one embodiment, transmitting the signals according to the second networking protocol is disabled until it is determined that the synchronization data have been positively identified and the PCS layer synchronization is acquired. That is, for at least some embodiments, the transmission function of a network device is disabled throughout operations 201 to 502. For example, if 5 corresponding /C/ordered sets have been received and positively identified by the PCS layer, a mode associated with an Active Ethernet protocol can be enabled.

For one embodiment, the second mode is enabled by enabling a second port of a multirate clock/data recovery ("CDR")/Serializer/Deserialiser ("SerDes") unit coupled to a second networking interface while disabling a first port of the multirate CDR/SerDes unit coupled to a first networking interface, as described in further detail below. For another embodiment, the second mode is enabled by directly connecting to a first networking interface, as described in further detail below. If the synchronization data have not been identified positively and the synchronization is not successful, method 500 returns back to operation 207.

Figure 6:
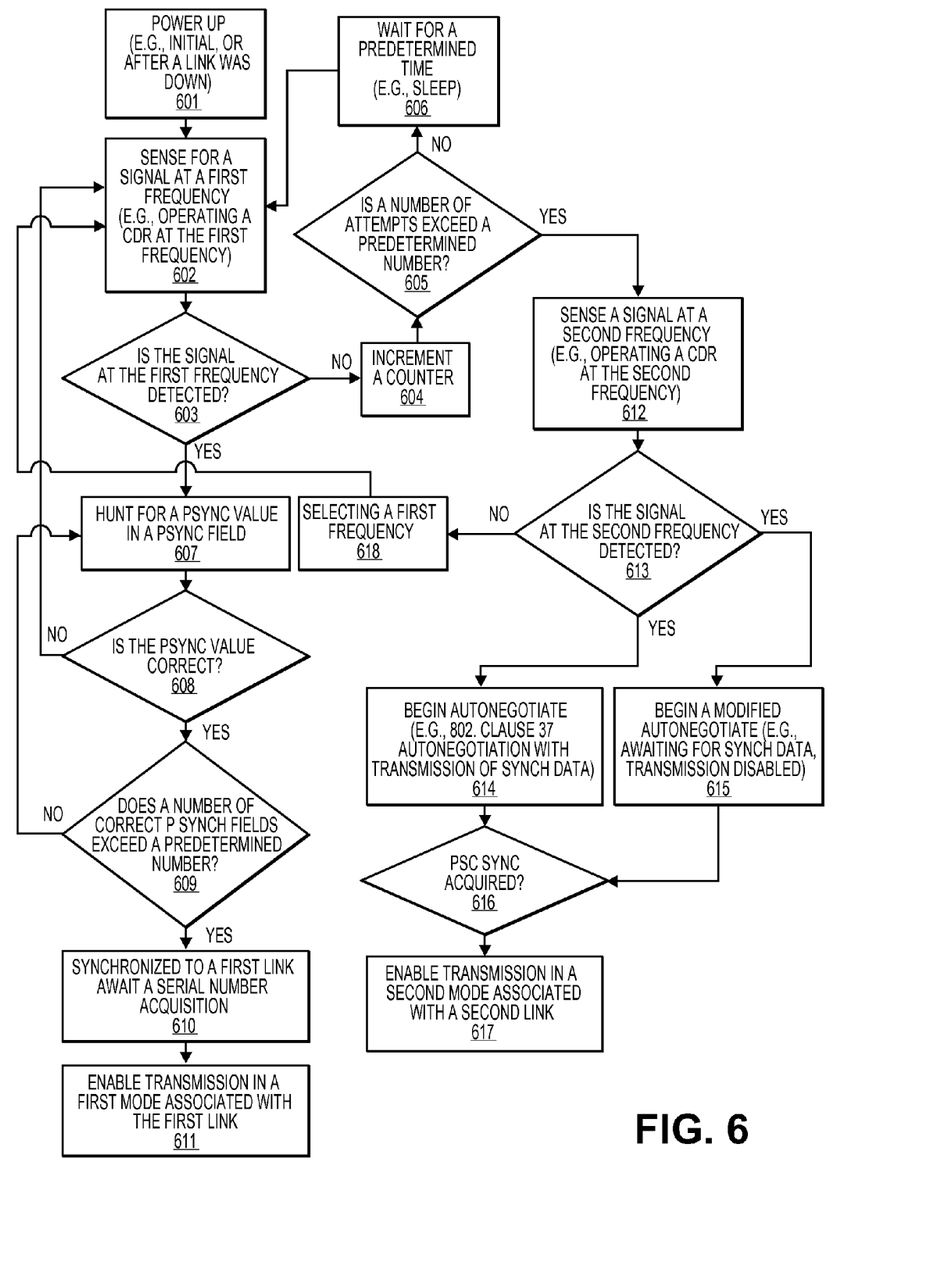
FIG. 6 shows a flowchart of another embodiment of a method performed by a network device to support a plurality of networking platforms.

FIG. 6 shows a flowchart of another embodiment of a method performed by a network device to support a plurality of networking platforms. Method 600 begins with operation 601 involving powering up the network device. The network device can be powered up initially (an initial power up), or after a link was down (for example, due to loss of carrier sense/signal detect or synchronization failure ("SYNC-FAIL assert"), as set forth above. Method 600 continues with operation 602 sensing a signal at a first frequency that corresponds to a first data transmission rate, as set forth above. For one embodiment, the first frequency is 2.48832 GHz that corresponds to data transmission rate of 2.48832 Gbps in downstream direction (from a central office to customer premises) for a point-to-multipoint networking protocol, e.g., a GPON protocol. Sensing a signal at a first frequency can involve setting a multirate clock-data recovery/serializer-deserializer ("CDR/SerDes") unit of the network device to operate at a first frequency out of a plurality of frequencies, as described in further detail below. At operation 603 it can be determined whether the signal at the first frequency has been detected. If the signal has been detected (e.g., "carrier sense" is asserted), hunt for physical synchronization data (e.g., Psync value) in a physical synchronization field (e.g., Psync field) of the signal begins at operation 607, as set forth above.

At operation 608 it is determined whether the Psync value is correct by comparing the Psync value with a predetermined value (e.g., 0xB6AB31E0) stored in a memory. For one embodiment, determining whether the Psync value is correct is performed according to Telecommunication Standardization Sector (ITU-T) of the International Telecommunication Union ("ITU") Recommendation G.984.3. For example, the pattern in the synchronization field of the detected signal can be searched for in all possible alignments, both bit and byte. If the Psync value is not correct, method 600 returns back to operation 602. If the Psync value is correct, a determination is made at operation 609 whether a number of consecutive physical synchronization fields in the detected one or more signals having correct Psync values exceeds a predetermined number. If the number of consecutive physical synchronization fields having correct Psync values does not exceed a predetermined number, method 600 returns back to operation 607. If the number of consecutive physical synchronization fields having correct Psync values exceeds a predetermined number, it is considered that the network device is synchronized to a link according to a first networking protocol, and a serial number acquisition is expected according to the first networking protocol at operation 610. That is, the networking protocol can be identified based on the number of correct consecutive physical synchronization fields in the frames of detected one or more signals. For example, detecting five consecutive correct physical synchronization fields in the one or more downstream signals at 2.48832 Gbps may be required to consider a network device synchronized to a GPON link. At operation 611 a first mode associated with the first networking protocol is enabled, as set forth above with respect to FIGS. 2-5. For at least some embodiments, the transmission function of a network device is disabled throughout operations 601 to 610, as set forth above with respect to FIGS. 2-5.

If the signal is not detected (e.g., a "carrier sense" is not asserted), a counter optionally can be incremented at operation 604. At operation 605 it can be determined whether a number of unsuccessful attempts to sense the signal exceed a predetermined number.

If the number of unsuccessful attempts to detect the signal at a first data transmission rate does not exceed the predetermined number, method 600 returns to operation 602 after waiting (e.g., going to sleep) for a predetermined time at operation 606, as set forth above. If the number of unsuccessful attempts to detect the signal at a first rate exceeds a predetermined number, or the signal at the first frequency has not been detected for a predetermined time (e.g., 5-15 seconds) operation 612 involving sensing a signal at a second frequency corresponding to a second data transmission rate according to a second networking protocol is performed, as set forth above. For one embodiment, sensing the signal at a second frequency involves switching a first operating frequency of CDR/SerDes unit to a second operating frequency, as described in further detail below. For one embodiment, if one or more signals are detected at 1.25 Gbps at a downstream link, the 1000X Ethernet protocol bring up commences.

At operation 613 it is determined whether the signal at the second frequency is detected. If the signal at the second frequency is not detected, method 600 continues with operation 618 that involves selecting another operating frequency, e.g., the first operating frequency of a CDR/SerDes unit. Optionally, method 600 may wait for a predetermined amount of time before returning to operation 602. If the signal at the second frequency is detected, method 600 continues with operation 614 or operation 615. Operation 614 involves starting an auto-negotiation process according to a second networking protocol. For example, the auto-negotiation process can involve transmitting /C/ordered sets to a remote end of a transmission link according to IEEE 802.3. Clause 37 networking protocol. For at least some embodiments, transmission is disabled at least from operations 601 to 613.

At operation 616 it is determined whether the auto-negotiation process is successful and the PCS synchronization is acquired. If the PCS synchronization have been acquired, a second mode associated with a second networking protocol is enabled, as set forth above with respect to FIGS. 2-5.

Alternatively, method 600 can continue with operation 615 that involves starting a modified auto-negotiation process. The modified auto-negotiation process can involve awaiting to receive a predetermined number of synchronization data associated with a second networking protocol from a remote network device at another end of a transmission link while keeping the transmission is disabled, as set forth above with respect to FIGS. 2-5.

At operation 616 it is determined whether the modified auto-negotiation process is successful and the PCS synchronization is acquired. If the PCS synchronization have been acquired, a second mode associated with a second networking protocol is enabled, as set forth above with respect to FIGS. 2-5. For at least some embodiments, the transmission function of a network device is disabled from operation 601 to operation 613, and from operation 615 to operation 616.

Figure 7:
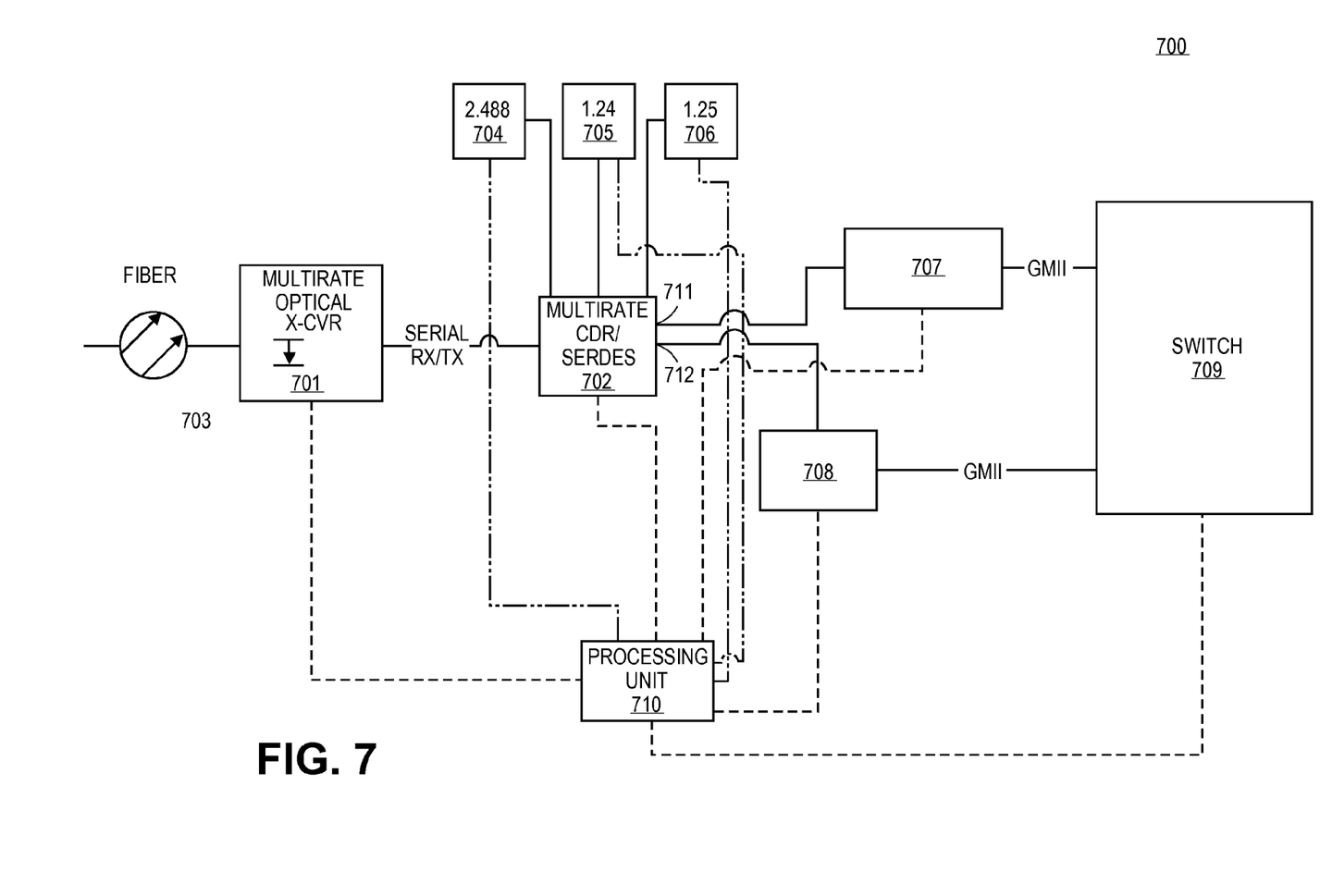
FIG. 7 is a block diagram of one embodiment of a network device to support a plurality of networking platforms.

FIG. 7 is a block diagram of one embodiment of a network device to support a plurality of networking platforms. As shown in FIG. 7, a network device 700 has a transceiver 701 having a transmitter and a receiver. Transceiver 701 is coupled to a clock-data recovery/serializer-deserializer ("CDR/SerDes") unit 702 to sense one or more optical signals received over an optical fiber 703. Sensing the one or more signals by transceiver 701 coupled to CDR/SerDes unit 702 is in response to powering up network device 700, as described above.

For one embodiment, optical transceiver 701 is a multirate optical transceiver that receives and transmits optical signals at a plurality of data transmission rates. CDR/SerDes unit 702 can be configured to detect (e.g, serialize, deserialize and decode) data from the optical signals received by transceiver 701 at a frequency selected from a plurality of frequencies, such as frequencies 704-706. These frequencies typically correspond to the data transmission rates according to variety of networking transmission protocols. For example, a frequency can be about 125 MegaHertz ("MHz"), 155 MHz, 622 MHz, 1.244 GigaHz ("GHz"), 1.25 GHz, 2.5 GHz, 10 GHz, 40 GHz, or any other frequency. As shown in FIG. 7, CDR/SerDes unit 702 has a port 711 and a port 712. Port 711 is coupled to a networking interface device 707, and port 712 is coupled to a networking interface device 708. As shown in FIG. 7, each of networking interface devices 707 and 708 is coupled to a switch 709 through networking interfaces (e.g., Gigabit Media Independent Interfaces ("GMII")). For one embodiment, in the methods and apparatuses described herein it is assumed that Ethernet frames are transported over the optical network either natively or by encapsulation in other protocols For one embodiment, device 707 is a Gigabit Transmission Convergence ("GTC") layer for GPON (e.g., GPON MAC GTC layer) and device 708 is a Physical Medium Attachment ("PMA") and Physical Coding Sub-layer ("PCS") sub-layer of the Ethernet (e.g., MAC 1000XP MAC/PCS), and switch 709 is a Gigabit Ethernet switch.

As shown in FIG. 7, a processing unit 710 can be coupled to transceiver 701, CDR/SerDes 702, networking interface device 707, networking interface device 708, and switch 709 by a bus. Bus, for example, can be Peripheral Component Interconnect ("PCI") bus, PCI-X, PCI Express, Universal Serial Bus ("USB"), IEEE 1394 bus (e.g., Firewire®), or any other bus known to one of ordinary skill in the art. Processing unit 710 can be a microprocessor or microcontroller, for example, Intel microprocessor (e.g., Core i7, Core 2 Duo, Core 2 Quad, Atom), Sun Microsystems microprocessor (e.g., SPARC), IBM microprocessor (e.g., IBM 750), Motorola microprocessor (e.g., Motorola 68000), Advanced Micro Devices ("AMD") microprocessor, Texas Instrument microcontroller, and any other microprocessor or microcontroller. For one embodiment, the processing unit 710 is a Central Processing Unit ("CPU"), a microcontroller, a digital signal processor, a microprocessor, a personal computer ("PC"), or any combination thereof. For one embodiment, processing unit 710 is a general purpose or specific purpose computer system based on Intel, AMD, Motorola, IBM, Sun Microsystems, IBM processor families, or any other processor families. For one embodiment, processing unit 710 includes a software algorithm stored in a memory to perform methods described herein.

For one embodiment, processing unit 710 is configured to select an operating frequency for CDR/SerDes unit 702. For one embodiment, processing unit 710 is configured to determine synchronization data from data detected by CDR/SerDec unit 701 at a first rate, as set forth above. Processing unit 710 can be further configured to determine a first networking protocol (e.g., a GPON protocol) based on the synchronization data. For one embodiment, the processing unit 710 can be configured to set CDR/SerDec unit 701 to sense one or more signals at a second rate, and to determine a second networking protocol (e.g., an Active Ethernet protocol), as set forth above.

For one embodiment, transmission of optical signals from transceiver 701 can be disabled by processing unit 710 until the networking protocol is determined, as set forth above. A memory (not shown) can be incorporated into processing unit 710. For one embodiment, determining the synchronization data includes comparing the synchronization data with a predetermined data stored in the memory, as set forth above.

For one embodiment, microprocessor 710 is further configured to enable a mode associated with a networking protocol, as set forth above. For one embodiment, a first mode associated with a first networking protocol (e.g., a GPON protocol) can be enabled by enabling transmission of data through port 711 according to the first networking protocol while disabling port 712. A second mode associated with a second networking protocol (e.g., Active Ethernet protocol)

can be enabled by enabling transmission of data through port 712 according to the second networking protocol while disabling transmission of data through port 711.

That is, a network device, as described in FIG. 7, utilizes two independent GMII interfaces into a switch. This network device assumes that each MAC function/switch port is capable to being enabled/disabled discreetly. In the context of FIG. 7 methods described above are implemented in software on a local host (processing unit 710) assuming the required management interfaces are available: laser on/off, carrier sense assert, etc. The architecture, as depicted in FIG. 7, has the advantage of potentially utilizing OEM (original equipment manufacturer) MAC chip sets at the cost of an additional switch interface. The clock and data recovery function is not duplicated by utilizing a multi-rate integrated circuit combining CDR and SerDes capable of asymmetric 2.488/1.244 Gbps and symmetric 1.25/1.25 Gbps operating frequencies.

Figure 8:
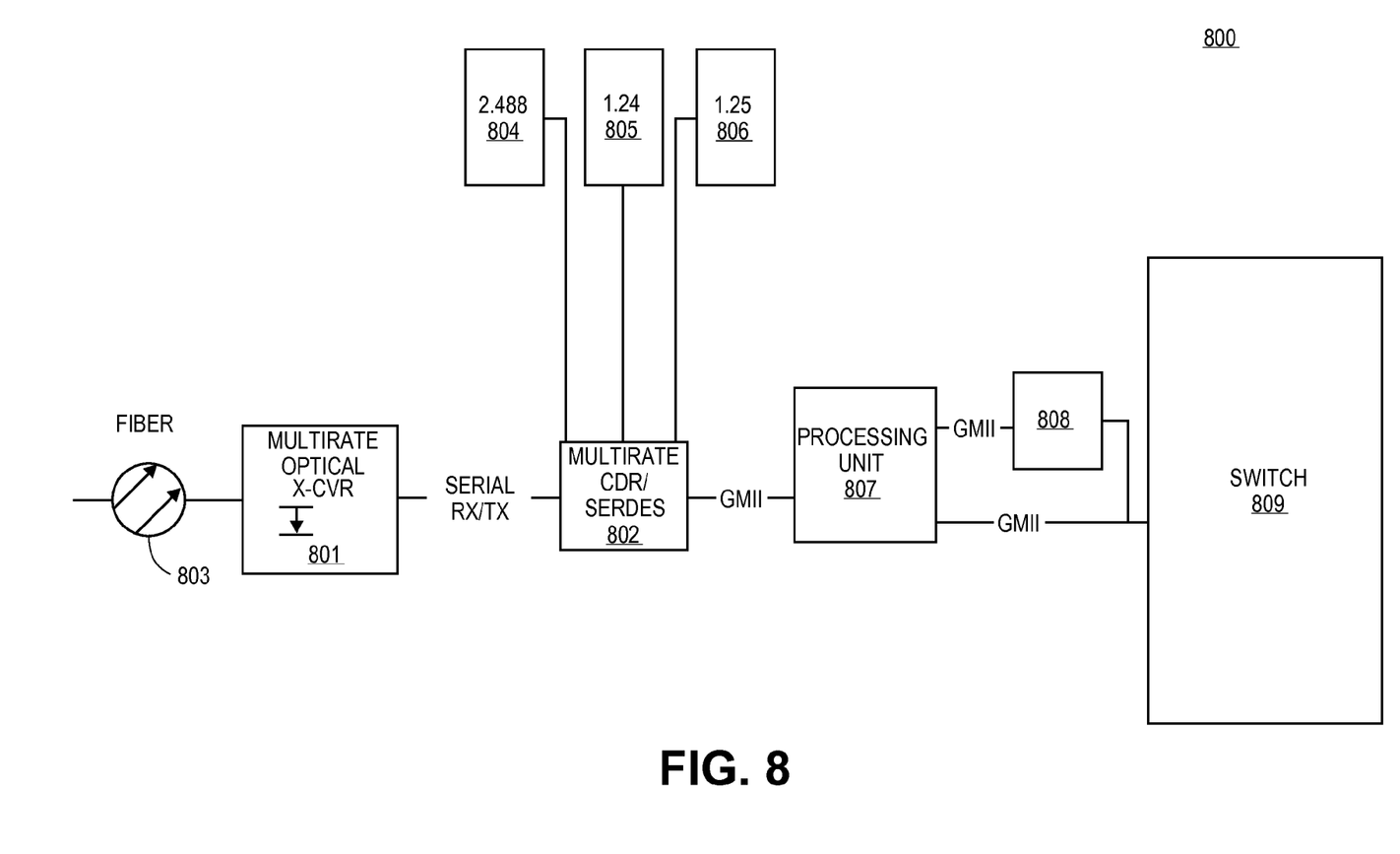
FIG. 8 is a block diagram of another embodiment of a network device to support a plurality of networking platforms.

FIG. 8 is a block diagram of another embodiment of a network device to support a plurality of networking platforms. A network device 800 has a multirate transceiver 801 having a transmitter and a receiver. Transceiver 801 is coupled to a multirate clock-data recovery/serializer-deserializer ("CDR/SerDes") unit 802 to sense one or more optical signals received over an optical fiber 803, as described above with respect to FIG. 7. As shown in FIG. 8, CDR/SerDes unit 802, similarly to unit 702 supports a plurality of frequencies, such as frequencies 804-806.

As shown in FIG. 8, CDR/SerDes unit 802 is coupled through a networking interface (e.g., GMII) to a processing unit 807. Processing unit 807 is coupled to a first networking protocol device 808 and to a second networking protocol device 809 through networking interfaces (e.g., GMII). For one embodiment, device 808 includes a Gigabit Transmission Convergence ("GTC") layer for GPON (e.g., GPON MAC GTC layer) and device 809 includes a Gigabit Ethernet switch containing a configurable internal Ethernet MAC.

For one embodiment, processing unit 807 is a reprogrammable hardware logic into which the firmware algorithm to perform methods described herein is programmed. That is, the reprogrammable hardware logic can analyze incoming data octets and perform the decision function without software intervention before the remainder of protocol dependent layer 2 functionality is completed, as set forth above with respect to FIGS. 2-6. For one embodiment, processing unit enables the first mode by enabling device 808, or enables the second mode by enabling device 809.

Figure 9:
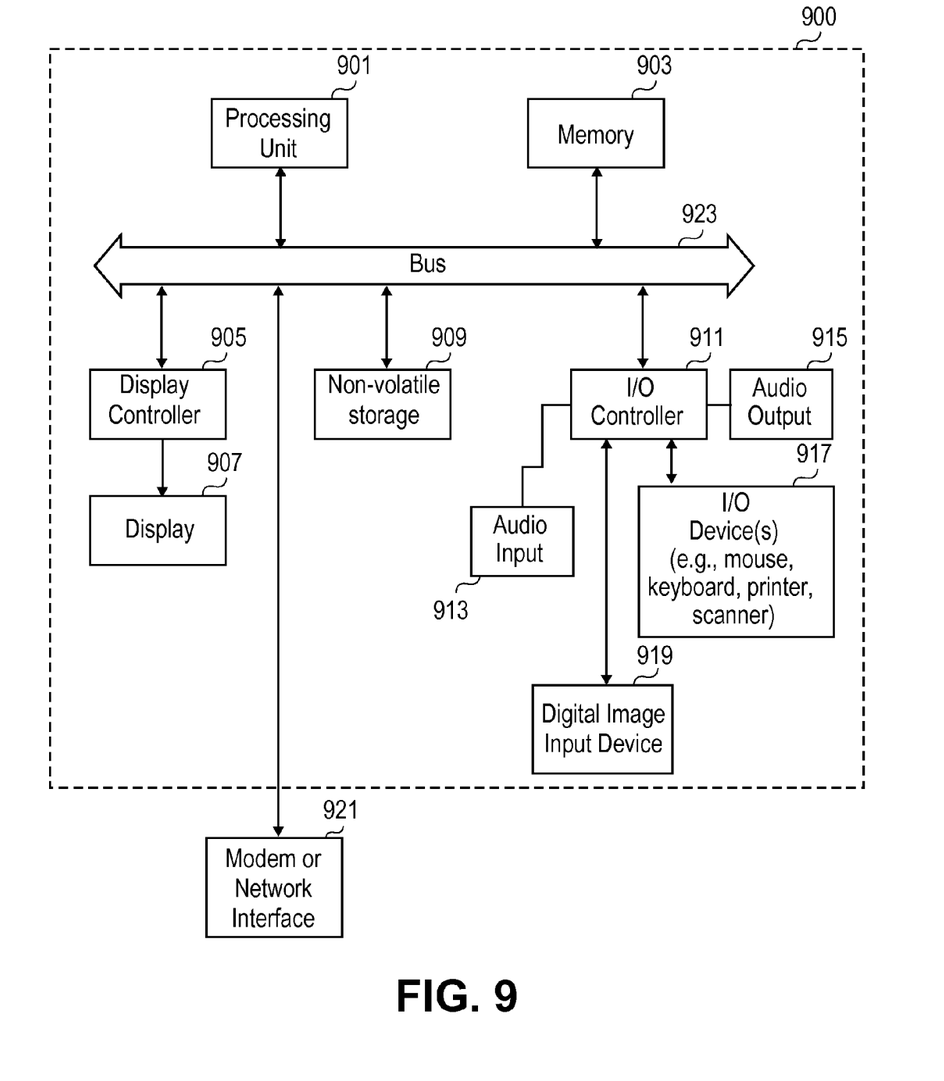
FIG. 9 shows a block diagram of one embodiment of a data processing system to support multiple networking platforms.

FIG. 9 shows a block diagram of one embodiment of a data processing system to support multiple networking platforms. Data processing system 900 includes a processing unit 901 that may include a microprocessor or microprocessor, such as Intel microprocessor (e.g., Core i7, Core 2 Duo, Core 2 Quad, Atom), Sun Microsystems microprocessor (e.g., SPARC), IBM microprocessor (e.g., IBM 750), Motorola microprocessor (e.g., Motorola 68000), Advanced Micro Devices ("AMD") microprocessor, Texas Instrument microcontroller, and any other microprocessor or microcontroller. Processing unit 901 may include a personal computer (PC), such as a Macintosh™ (from Apple Inc. of Cupertino, Calif.), Windows™-based PC (from Microsoft Corporation of Redmond, Washington), or one of a wide variety of hardware platforms that run the UNIX operating system or other operating systems. For one embodiment, processing unit 901 includes a general purpose or specific purpose data processing system based on Intel, AMD, Motorola, IBM, Sun Microsystems, IBM processor families, or any other processor families. As shown in FIG. 9, memory 903 is coupled to the processing unit 901 by a bus 323. Memory 903 can be dynamic random access memory (DRAM) and can also include static random access memory (SRAM). A bus 923 couples processing unit 901 to the memory 903 and also to non-volatile storage 909 and to display controller 905 (if a display is used) and to the input/output (I/O) controller(s) 911. Display controller 905 controls in the conventional manner a display on a display device 907 which can be a cathode ray tube (CRT) or liquid crystal display (LCD). The input/output devices 917 can include a keyboard, disk drives, printers, a scanner, a camera, and other input and output devices, including a mouse or other pointing device. The I/O controller 911 is coupled to one or more audio input devices 913, for example, one or more microphones.

The display controller 905 and the I/O controller 911 can be implemented with conventional well known technology. An audio output 915, for example, one or more speakers may be coupled to an I/O controller 911. The non-volatile storage 909 is often a magnetic hard disk, an optical disk, or another form of storage for large amounts of data. Some of this data is often written, by a direct memory access process, into memory 903 during execution of software in the data processing system 900 to perform methods described herein. One of skill in the art will immediately recognize that the terms "computer-readable medium" and "machine-readable medium" include any type of storage device that is accessible by the processing unit 901. A data processing system 900 can interface to external systems through a modem or network interface 921. It will be appreciated that the modem or network interface 921 can be considered to be part of the data processing system 900. This interface 921 can be an analog modem, ISDN modem, cable modem, token ring interface, satellite transmission interface, or other interfaces for coupling a data processing system to other data processing systems.

It will be appreciated that data processing system 900 is one example of many possible data processing systems which have different architectures. For example, personal computers based on an Intel microprocessor often have multiple buses, one of which can be an input/output (I/O) bus for the peripherals and one that directly connects the processing unit 901 and the memory 903 (often referred to as a memory bus). The buses are connected together through bridge components that perform any necessary translation due to differing bus protocols.

Network computers are another type of data processing system that can be used with the embodiments of the present invention. Network computers do not usually include a hard disk or other mass storage, and the executable programs are loaded from a network connection into the memory 903 for execution by the processing unit 901. A typical data processing system will usually include at least a processor, memory, and a bus coupling the memory to the processor.

It will also be appreciated that the data processing system 900 can be controlled by operating system software which includes a file management system, such as a disk operating system, which is part of the operating system software. Operating system software can be the family of operating systems known as Macintosh™ Operating System (Mac OS™) or Mac OS X™ from Apple Inc. of Cupertino, Calif., or the family of operating systems known as Windows™ from Microsoft Corporation of Redmond, Wash., and their associated file management systems. The file management system is typically stored in the non-volatile storage 909 and causes the processing unit 901 to execute the various acts required by the operating system to input and output data and to store data in memory, including storing files on the non-volatile storage 909.

In various embodiments, hardwired circuitry may be used in combination with software instructions to implement methods described herein. A machine readable medium can be used to store software and data which when executed by a data processing system causes the system to perform various methods of the present invention. This executable software and data may be stored in various places including for example ROM, volatile RAM, non-volatile memory, and/or cache. Portions of this software and/or data may be stored in any one of these storage devices.

Thus, a machine readable medium includes any mechanism that provides (i.e., stores and/or transmits) information in a form accessible by a machine (e.g., a computer, network device, or any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 900 of FIG. 9.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A method to support a plurality of networking platforms, comprising:
sensing one or more first signals;
searching for first fields in the one or more first signals;
determining first synchronization data associated with the one or more first signals;
determining whether a number of the first fields having the first synchronization data is greater than a predetermined number; and
determining a first networking protocol based on the first synchronization data,
wherein the first networking protocol is determined before transmission is enabled at a network device, and wherein the first networking protocol is determined if the number of the first fields having the first synchronization data is greater than the predetermined number.

2. A method as in claim 1, further comprising enabling transmission in a first mode associated with the first networking protocol.

3. A method as in claim 1, wherein the determining the first synchronization data includes
comparing the first synchronization data with a predetermined data stored in a memory.

4. A method as in claim 1, wherein the one or more first signals are sensed at a first rate.

5. A method as in claim 1, wherein the sensing the one or more first signals is in response to powering up the network device.

6. A method as in claim 1, further comprising
enabling a first mode associated with the first networking protocol if the first networking protocol is determined.

7. A method as in claim 1, wherein the first networking protocol includes a Passive Optical Network ("PON") protocol.

8. A method as in claim 1, further comprising
sensing one or more second signals at a second rate; and
determining a second networking protocol based on the one or more second signals.

9. A method as in claim 8, wherein the second networking protocol comprises an Ethernet protocol.

10. A method as in claim 8, further comprising
determining second synchronization data associated with the one or more second signals;
enabling a second mode associated with the second networking protocol based on the second synchronization data.

11. A method as in claim 10, wherein the determining the second synchronization data includes transmitting third synchronization data.

12. A method as in claim 10, wherein the determining the second synchronization data includes receiving fourth synchronization data.

13. A network device, comprising
a transceiver; and
a clock/data recovery unit coupled to the transceiver to sense one or more first signals;
a processing unit coupled to the transceiver, the processing unit configured to search for first fields in the one or more first signals; to determine first synchronization data associated with the one or more first signals, to determine whether a number of the first fields having the first synchronization data is greater than a predetermined number; and to determine a first networking protocol based on the first synchronization data, wherein transmission from the transceiver is disabled until the first networking protocol is determined, and wherein the first networking protocol is determined if the number of the first fields having the first synchronization data is greater than the predetermined number; and
a memory coupled to the processing unit.

14. A network device as in claim 13, wherein the processing unit is further configured to enable transmission in a first mode associated with the first networking protocol.

15. A network device as in claim 13, wherein the determining the first synchronization data includes comparing the first synchronization data with a predetermined data stored in the memory.

16. A network device as in claim 13, wherein the clock/data recovery unit coupled to the transceiver is configured to sense the one or more first signals at a first rate.

17. A network device as in claim 13, wherein the sensing the one or more first signals is in response to powering up the network device.

18. A network device as in claim 13, wherein the processing unit is further configured to enable a first mode associated with the first networking protocol.

19. A network device as in claim 13, wherein the first networking protocol includes a Passive Optical Network ("PON") protocol.

20. A network device as in claim 13, wherein the processing unit is further configured to set the clock/data recovery unit to sense one or more second signals at a second rate; and to determine a second networking protocol based on the one or more second signals.

21. A network device as in claim 20, wherein the second networking protocol comprises an Ethernet protocol.

22. A network device as in claim 20, wherein the processing unit is further configured to determine second synchronization data associated with the one or more second signals; and enable a second mode associated with the second networking protocol based on the second synchronization data.

23. A network device as in claim 22, wherein the determining the second synchronization data includes transmitting third synchronization data.

24. A network device as in claim 22, wherein the determining the second synchronization
data includes receiving fourth synchronization data.

25. A network device as in claim 13, wherein the processing unit includes a reprogrammable logic coupled to the clock/data recovery unit; wherein the reprogrammable logic is further coupled to a first networking protocol interface; and to a second networking protocol interface.

26. A network device as in claim 13, wherein the clock/data recovery unit includes a first port to a first networking interface and a second port to a second networking interface.

27. A network device as in claim 13, further comprising a switch.

28. A non-transitory machine-readable storage medium storing executable program instructions which when executed by a data processing system causes the system to perform operations, comprising:
sensing one or more first signals;
searching for first fields in the one or more first signals;
determining first synchronization data associated with the one or more first signals;
determining whether a number of the first fields having the first synchronization data is greater than a predetermined number;
and
determining a first networking protocol based on the first synchronization data, wherein the first networking protocol is determined before transmission is enabled at a network device, and wherein the first networking protocol is determined if the number of the first fields having the first synchronization data is greater than the predetermined number.

29. A non-transitory machine-readable storage medium as in claim 28, further comprising instructions that cause the system to perform operations comprising
enabling transmission in a first mode associated with the first networking protocol.

30. A non-transitory machine-readable storage medium as in claim 28, wherein the determining the first synchronization data includes
comparing the first synchronization data with a predetermined data stored in a memory.

31. A non-transitory machine-readable storage medium as in claim 28, wherein the one or more first signals are sensed at a first rate.

32. A non-transitory machine-readable storage medium as in claim 28, wherein the sensing the one or more first signals is in response to powering up the network device.

33. A non-transitory machine-readable storage medium as in claim 28, further comprising instructions that cause the data processing system to perform operations comprising
enabling a first mode associated with the first networking protocol.

34. A non-transitory machine-readable storage medium as in claim 28, wherein the first networking protocol includes a Passive Optical Network ("PON") protocol.

35. A non-transitory machine-readable storage medium as in claim 28, further comprising
instructions that cause the system to perform operations comprising
sensing one or more second signals at a second rate; and
determining a second networking protocol based on the one or more second signals.

36. A non-transitory machine-readable storage medium as in claim 35, wherein the second networking protocol includes an Ethernet protocol.

37. A non-transitory machine-readable storage medium as in claim 35, further comprising instructions that cause the system to perform operations comprising determining second synchronization data associated with the one or more second signals;
enabling a second mode associated with the second networking protocol based on the second synchronization data.

38. A non-transitory machine-readable storage medium as in claim 37, wherein the determining the second synchronization data includes transmitting third synchronization data.

39. A non-transitory machine-readable storage medium as in claim 37, wherein the determining the second synchronization data includes receiving fourth synchronization data.

40. A system to support a plurality of networking platforms, comprising:
means for sensing one or more first signals;
means for searching for first fields in the one or more first signals;
means for determining first synchronization data associated with the one or more first signals;
means for determining whether a number of the first fields having the first synchronization data is greater than a predetermined number;
and
means for determining a first networking protocol based on the first synchronization data, wherein the first networking protocol is determined before transmission is enabled at a network device, and wherein the first networking protocol is determined if the number of the first fields having the first synchronization data is greater than the predetermined number.

* * * * *